United States Patent
Kanemitsu

(12) 
(10) Patent No.: US 6,768,540 B2
(45) Date of Patent: Jul. 27, 2004

(54) PHASE DIFFERENCE DETECTION METHOD, PHASE DIFFERENCE DETECTION APPARATUS, RANGE FINDING APPARATUS AND IMAGING APPARATUS

(75) Inventor: Shiroshi Kanemitsu, Narashino (JP)

(73) Assignee: Seiko Precision Inc., Chiba-ken (JP)

( * ) Notice: Subject to any disclaimer, the term of this patent is extended or adjusted under 35 U.S.C. 154(b) by 0 days.

(21) Appl. No.: 10/374,470

(22) Filed: Feb. 25, 2003

(65) Prior Publication Data

US 2003/0164935 A1 Sep. 4, 2003

(30) Foreign Application Priority Data

Feb. 26, 2002 (JP) ........................................ 2002-049606

(51) Int. Cl.[7] .......................... G01C 3/00; G03B 13/00; G02B 7/04
(52) U.S. Cl. ................ 356/3.14; 250/201.6; 250/201.8; 356/3.15; 396/128
(58) Field of Search .......................... 250/201.6, 201.8; 356/3.14, 3.15; 396/128

(56) References Cited

U.S. PATENT DOCUMENTS

| | | | |
|---|---|---|---|
| 4,004,852 A | * | 1/1977 | Pentecost |
| 5,093,562 A | * | 3/1992 | Okisu et al. ............. 250/201.8 |
| 5,467,163 A | * | 11/1995 | Uchiyama |
| 6,108,435 A | * | 8/2000 | Mori et al. |

* cited by examiner

Primary Examiner—Stephen C. Buczinski
(74) Attorney, Agent, or Firm—Adams & Wilks

(57) ABSTRACT

A phase difference detection apparatus for detecting a phase difference between images formed on a pair of optical sensor arrays in which the possibility of unproductive compensation is reduced by use of a compensation effectiveness judgment unit that judges whether or not compensation of a pair of image data rows would be effective. A compensation unit calculates a compensation amount based on a difference in maximum values and minimum values in a pair of image data rows corresponding to the images produced by the optical sensor arrays and compensates the image data rows by the calculated compensation amount. Based upon the compensated values, a correlation calculation unit carries out a correlation calculation, and a maximum correlation detection unit detects a maximum correlation level. Based upon the maximum correlation level, a interpolation calculation unit carries out an interpolation calculation, and a phase difference is detected by a phase difference detection unit.

25 Claims, 4 Drawing Sheets

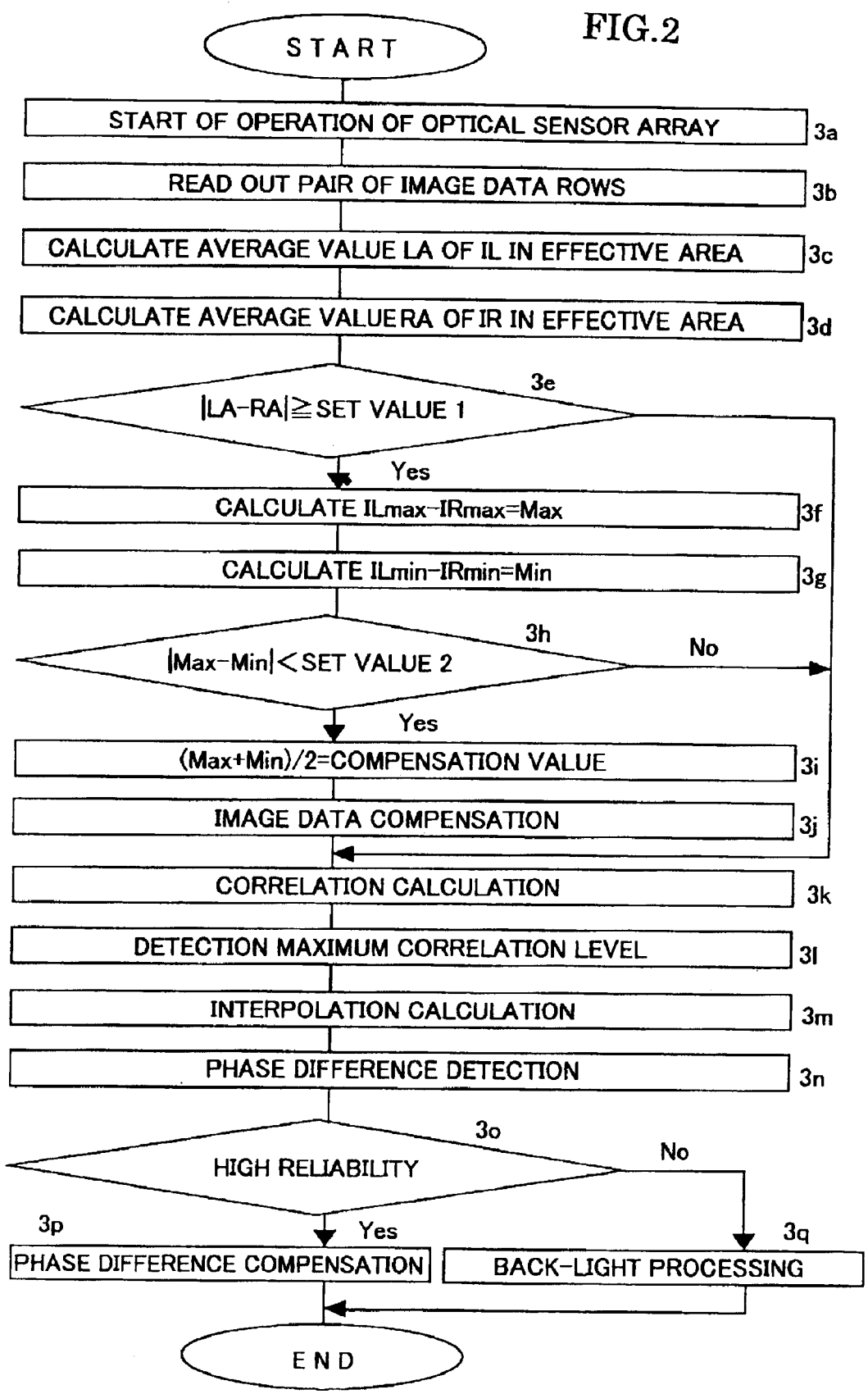

PHASE DIFFERENCE DETECTION METHOD, PHASE DIFFERENCE DETECTION APPARATUS, RANGE FINDING APPARATUS AND IMAGING APPARATUS

BACKGROUND OF THE INVENTION

1. Field of the Invention

The present invention relates to a phase difference detection method, a phase difference detection apparatus, a range finding apparatus and an imaging apparatus.

2. Description of the Related Art

In a conventional automatic focusing camera and the like, when focusing on an object to be photographed by use of a so-called passive system, in case of a non-TTL camera, the distance to the object is detected by use of an image of the object which does not pass through a taking lens. Thereafter, a position of the taking lens is controlled in response to the detected distance to the object. In the case of a TTL camera, a shift amount from a focused state is detected by use of an image of the object obtained through the taking lens. Thereafter, the rotational position of the taking lens is controlled in response to the detected shift amount. The principle of the above-described series of operations will be described below with reference to FIG. 3A.

As shown, a pair of lenses 1a and 1b are disposed apart from each other by a predetermined base line length b, and images of an object 2 are respectively formed through optical paths A and B which are different from each other on a pair of optical sensor arrays 3a and 3b which are disposed apart from the pair of lenses 1a and 1b by a focal distance f. It is assumed that the object 2 is located at a position in front of the pair of lenses 1a and 1b by a distance L.

When the object 2 is located at a distance L of infinity, centers of the images formed on the pair of optical sensor arrays 3a and 3b are formed at reference positions (3a1, 3b1) on the optical sensor arrays 3a and 3b which correspond to optical axes of the lenses 1a and 1b. However, when the object 2 is closer than a distance of infinity, the images are formed at positions which are shifted by an amount (from reference positions 3a1, 3b1). Based on the principle of triangular ranging, the distance L to the object 2 equals $bf/\alpha$. Here, since the base line length b and the focal distance f are constants, if the shift amount $\alpha$ is detected, the distance L can be calculated. This is the principle of passive ranging (so-called outside light triangular ranging), which is used in the non-TTL camera. In the non-TTL camera, the shift amount a may be used as it is for calculation purposes instead of using the distance L as an output value of a range finding apparatus.

In case of the TTL camera, by applying a light passed through an imaging lens (not shown) to the pair of lenses 1a and 1b in the same manner as described above, the shift amount $\alpha$ between a pair of left and right images is detected. In this case, it is assumed that centers of images in case of a focused state are reference positions on the respective optical sensor arrays 3a and 3b. Thus, positive and negative values of the shift amount $\alpha$ indicate a front focus state and a rear focus state, respectively, and the absolute values thereof indicate an extent of the shift from in-focus. In addition, in the present specification, the shift amount a$\alpha$ is referred to as a phase difference.

In any of the cameras described above, the image of an object to be photographed is formed on the pair of optical sensor arrays by an optical system, and a relative shift of the pair of image signals output by the pair of optical sensor arrays, i.e., the phase difference, is detected by carrying out a process known as correlation calculation about partial image data groups (see FIG. 3B) extracted from the pair of image signals, respectively. In addition, phase difference detection as described above is not limited to automatic focusing cameras but can be used for various range finding apparatuses, focal point detection apparatuses, and the like, which measure the distance to an object or focus on an object.

In an apparatus which uses phase difference detection as a method for reducing degradation of detection accuracy due to the presence of a back-light from strong light sources such as the sun, which serve as a background of an object to be photographed (at a time of so-called back-light), there is one such device which is described, for example, in Japanese Patent No. 3,230,759 (JP-A-5-264892). More specifically, it is judged whether or not there is an effect of a flare light acting as a back-light on the output of an optical sensor. When it is judged that there is an effect of a flare light, a compensation value based upon a difference in light intensities of the pair of the image signals and, more particularly, based on a difference in average values of respective image signals, is calculated. The calculated compensation value is added to or subtracted from one of the image signals. The phase difference is then calculated by carrying out the correlation calculation based upon the image signal after performing such compensation.

However, the effect caused by a back-light is fairly complicated, and even if a predetermined compensation routine is carried out to correct the image signal as described above, the effect of the back-light is not necessarily removed. For example, when the pair of image signals take on the states shown in FIGS. 4A and 4B due to the presence of a back-light, even if the compensation value is determined based upon the difference in light intensities of the pair of image signals in the manner described above and compensation is performed by adding or subtracting the calculated compensation value to or from one of the image signals, it becomes difficult to remove the effect of the back-light from the image signal. Accordingly, in the technology described in the above U.S. Pat. No. 3,230,759 (JP-A-5-264892), there is a possibility that a non-productive compensation is carried out.

SUMMARY OF THE INVENTION

An object of the present invention is to provide a phase difference detection method, a phase difference detection apparatus, a ranging (or range finding) apparatus, and a imaging apparatus which can reduce the possibility of non-productive compensation.

A phase difference detection method in accordance with a first aspect of the present invention comprises a judgment step of judging whether or not a predetermined compensation would be effective on an image data row which is generated in response to outputs of a pair of optical sensor arrays on which images of a measurement image object are formed, a first phase difference detection step of detecting a phase difference between the images formed on the pair of sensor arrays based upon the image data row when it is judged that the predetermined compensation would not be effective, and a second phase difference detection step of carrying out the predetermined compensation with respect to the image data row when it is judged that the predetermined compensation would be effective and of detecting a phase difference between the images formed on the pair of sensor arrays based upon the image data row after performing the predetermined compensation.

By the foregoing method, when it is judged that the predetermined compensation would not be effective based upon the image data row, the phase difference between the images formed on the pair of sensor arrays is detected, and when it is judged that the predetermined compensation would be effective, the predetermined compensation is applied to the image data row and, based upon the compensated image data, the phase difference of the images formed on the pair of sensor arrays is detected. Thus, it becomes possible to reduce the occurrence of unproductive compensation.

In accordance with a second aspect of the present invention, the predetermined compensation is deemed effective when, based upon the image data row, an output waveform of one of the pair of optical sensor arrays is shifted in parallel with respect to an output waveform of one the other optical sensor array, and the compensation is based upon the amount of the shift. Accordingly, in addition to the above-described advantage, effective compensation can be carried out when the output waveform of one of the pair of optical sensor arrays is shifted in parallel to the output waveform of the other optical sensor array.

In accordance with a third aspect of the present invention, the image data row is a pair of image data rows each comprising a plurality of image data values which are generated in response to outputs of the pair of optical sensor arrays on which the images of the measurement image object are formed, the judgment step is performed to judge whether the predetermined compensation would be effective when a difference between a difference in maximum value image data in each of the pair of image data rows and a difference in minimum value image data in each of the pair of image data rows falls within a predetermined range, and compensation is performed to compensate the image data rows by a compensation value determined based upon the difference in the maximum value image data and the difference in the minimum value image data.

By the foregoing method, it is possible to reduce the possibility of non-productive compensation. In addition, since the difference in the maximum value image data and the difference in the minimum value image data are used for judging whether or not the difference falls within the predetermined range and also for calculating the compensation value, it becomes possible to achieve dual uses of the same data.

In accordance with a fourth aspect of the present invention, a phase difference detection apparatus is provided, which comprises a judgment unit for judging whether or not a predetermined compensation would be effective to compensate an image data row which is generated in response to outputs of a pair of optical sensor arrays on which images of a measurement image object are formed, a first phase difference detection unit for detecting a phase difference between the images formed on the pair of sensor arrays based upon the image data row when it is judged by the judgment unit that the predetermined compensation would not be effective, and a second phase difference detection unit for carrying out the predetermined compensation with respect to the image data row when it is judged by the judgment unit that the predetermined compensation would be effective and detecting a phase difference between the images formed on the pair of sensor arrays based upon the image data row after performing the compensation.

By the foregoing structure, when it is judged that the predetermined compensation would not be effective based upon the image data row, the phase difference between the images formed on the pair of sensor arrays is detected without performing compensation. On the other hand, when the predetermined compensation is deemed to be effective, the predetermined compensation is applied to the image data row. Based upon the image data obtained after performing the compensation, the phase difference between the images formed on the pair of sensor arrays is detected, and it becomes possible to reduce the possibility of performing unproductive compensation.

In accordance with a fifth aspect of the present invention, the judgment unit judges that the predetermined compensation is effective when, based upon the image data row, an output waveform of one of the pair of optical sensor arrays is shifted in parallel with respect to an output waveform of the other optical sensor array, and the compensation is based upon the amount of such shift. In addition to the above-described advantage, this enables effective compensation to be carried out when the output waveform of one of the pair of optical sensor arrays is shifted in parallel relative to the output waveform of the other optical sensor array.

In accordance with a sixth aspect of the present invention, the image data row of the foregoing aspect is a pair of image data rows each comprising a plurality of image data units which are generated in response to outputs of the pair of optical sensor arrays on which the images of the measurement image object are formed, the judgment unit judges that the predetermined compensation would be effective when a difference between a difference in maximum value image data in each of the pair of image data rows and a difference in minimum value image data in each of the pair of image data rows falls within a predetermined range, and compensation is performed to compensate the image data rows by a compensation value based upon the difference of the maximum value image data and the difference of the minimum value image data. Accordingly, in addition to the above-described advantages, since the difference in the maximum value image data and the difference in the minimum value image data are used when judging whether or not the difference falls within the predetermined range and calculating the compensation value, it becomes possible to achieve dual uses of the same data.

In accordance with a seventh aspect of the present invention, any one of the fourth through sixth aspects is further provided with a second judgment unit for judging whether or not there is an effect of a back-light on the images formed on the pair of sensor arrays based upon the image data row, and a third phase difference detection unit for detecting a phase difference between the images formed on the pair of sensor arrays based upon the image data row when the second judgment unit judges that there is no effect of back-light, wherein the judgment unit carries out the judgment when the second judgment unit judges that there is an effect caused by the back-light. In addition to the above-described advantages, since, in case that it is judged that there is no effect of back-light, the phase difference detection is carried out without judging whether or not the predetermined compensation is effective, this judgment can be eliminated when there is no need for carrying out the judgment of whether or not the predetermined compensation is effective.

In accordance with an eighth aspect of the present invention, a range finding apparatus comprises the above-described phase difference detection apparatus, and a distance detection unit for calculating a distance to a target based upon a phase difference detected by the phase difference detection apparatus. By such a structure, in addition to the above-described advantages, it becomes possible to reduce the possibility of non-productive compensation when calculating the distance data.

In accordance with a ninth aspect of the present invention, an imaging apparatus comprises the above-described phase difference detection apparatus, an objective lens, an image formation unit on which an image of the target passed through the objective lens is formed, and a focusing control unit for carrying out a focusing operation between the objective lens and the image formation unit in response to the phase difference calculated by the phase difference detection apparatus. By such structure, it becomes possible to reduce the possibility of non-productive compensation when carrying out the focusing operation.

BRIEF DESCRIPTION OF THE DRAWINGS

The invention, together with further advantages thereof, may best be understood by reference to the following description taken in conjunction with the accompanying drawings in which:

FIG. 2 is a flowchart for an operational explanation of FIG. 1;

DETAILED DESCRIPTION OF THE INVENTION

Figure 1:
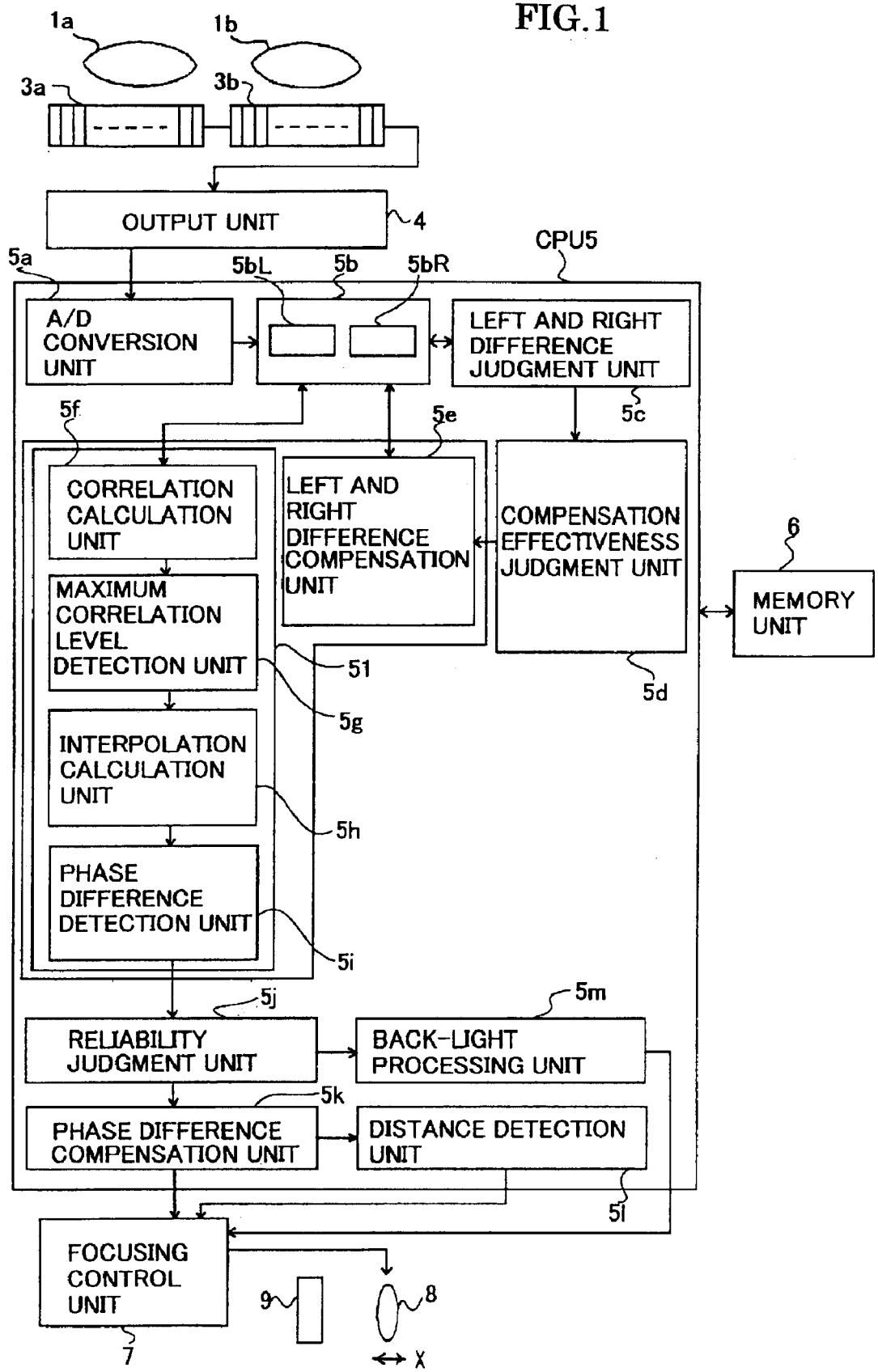
FIG. 1 is a block circuit diagram showing one example of the invention.
Figure 3A:
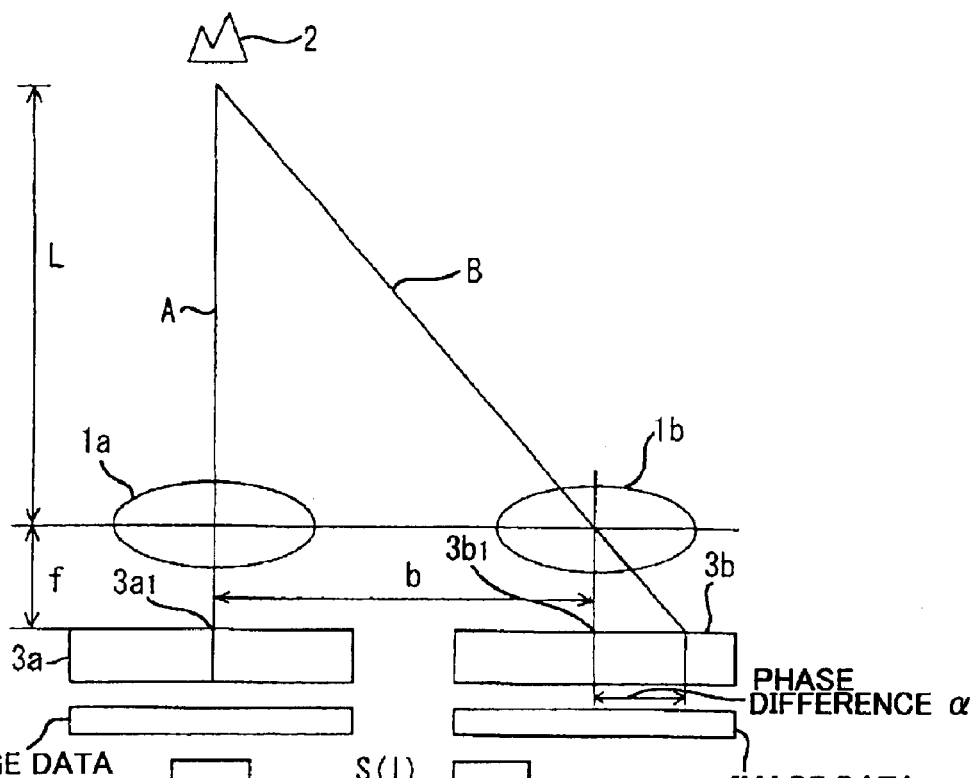
FIGS. 3A and 3B are explanatory views illustrating the operation of the FIG. 1 embodiment.

Hereinafter, a preferred embodiment of the invention will be described with reference to one embodiment shown in the drawings. FIG. 1 is an example in which the invention is embodied as an imaging apparatus. In addition, in FIG. 1, the same reference numerals are applied to the same structural components as in FIG. 3.

In FIG. 1, the pair of lenses 1a and 1b form images of the object 2 as described above, respectively on the pair of optical sensor arrays 3a and 3b. Each of the optical sensor arrays 3a and 3b is of a structure having 162 pixels (photoelectric conversion device) located along a line, and each pixel outputs an electric signal which corresponds to the light intensity of the image of the object 2 which was formed on the pixel. As will be appreciated, it is possible to change the number of pixels in the pair of optical sensor arrays 3a and 3b as desired.

An output unit 4 provides the outputs of the pair of optical sensor arrays 3a and 3b to a CPU 5. The CPU 5 has first, second and third phase difference detection units, a first judgment unit, a second judgment unit and a distance detection unit for processing the outputs of the pair of optical sensor arrays 3a and 3b which are input thereto, as described below, based upon various programs and various data which are stored in a memory unit 6. A focusing control unit 7 is controlled by the CPU 5 and drives an objective lens 8 in opposite directions shown by arrow X to carry out a focusing operation between the objective lens 8 and an image formation unit 9. In addition, the image formation unit 9 may be a silver film and/or may be a solid-state imaging device having a photoelectric conversion device such as a so-called CCD sensor, a CMOS sensor, or the like.

Next, an operation of the device with particular emphasis on the function of the CPU 5 will be described with reference to FIGS. 1 and 2. In order to best explain the relevant functions of the CPU 5, a functional block diagram of the CPU 5 is shown in FIG. 1.

When a release switch (not shown) of the imaging device is operated, the pair of optical sensor arrays 3a and 3b start operation (step 3a). As described above, images of the object 2 are formed on the pair of optical sensor arrays 3a and 3b by the pair of lenses 1a and 1b through optical paths A and B which are different from each other, and an electric signal which corresponds to light intensity of the image is output from the pair of optical sensor arrays 3a and 3b.

An A/D conversion unit 5a converts the outputs of the pair of optical sensor arrays 3a and 3b which are input through the output part 4 from analog to digital. A memory unit 5b stores the outputs of the pair of optical sensor arrays 3a and 3b which were A/D converted into a pair of memory areas 5bL and 5bR as a pair of image data rows (IL, IR). In the presently described embodiment, the output of the optical sensor array 3a which was A/D converted is stored in the memory area 5bL and, in a similar manner, the output of the optical sensor array 3b which was A/D converted is stored in the memory area 5bR. Also, in the presently described embodiment, since the number of pixels of the pair of optical sensor arrays 3a and 3b is 162, respectively, the image data rows (IL, IR) are configured respectively by 162 data locations (IL(1-162), IR(1-162)).

A left and right difference judgment unit 5c serving as a second judgment unit reads out an image data row (in this embodiment, IL(1-162), IR(1-162)) in an effective area respectively from the pair of image data rows (IL, IR) stored in the memory 5b (step 3b), calculates an absolute value of a difference in their average values LA and RA (hereinafter, referred to as "left and right difference"), and judges whether or not the calculated left and right difference is more than a set value 1 (steps 3c, 3d and 3e).

More specifically, if the left and right difference is more than the set value 1, it is judged that there is an effect due to back-light and/or stray light on the image formed on the pair of optical sensor arrays 3a and 3b. If the left and right difference is less than the set value 1, it is judged that there is no effect of back-light or stray light on the image formed on the pair of optical sensor arrays 3a and 3b. In addition, the effective area is not limited to the above-described one but may be changed as desired. It should be noted that it is preferable for the set value 1 to be set to a value which is close to 0, while taking into consideration an error of an optical system and a conversion error of the optical sensor array.

In the event that the left and right difference judgment unit 5c judges that the absolute value of the difference in the average values of the pair of image data rows (IL, IR) is more than the set value 1, i.e., when there is an effect due to back-light and/or stray light on the image formed on the pair of optical sensor arrays 3a and 3b, a compensation effectiveness judgment unit 5d serving as the judgment unit calculates a difference between (hereinafter, referred to "Max") a maximum value of IL(1-162) in the effective area (hereinafter, referred to as "ILmax") and a maximum value of IR(1-162) (hereinafter, referred to as "IRmax") in the effective area and a difference (hereinafter, referred to "Min") between a minimum value of IL(1-162) (hereinafter, referred to as "ILmin") and a minimum value of IR(1-162) (hereinafter, referred to as "IRmin") (steps 3f and 3g), and judges whether or not an absolute value of a difference of Max and Min is smaller than a set value 2 (step 3h).

In particular, when the absolute value of the difference of Max and Min is smaller than the set value 2, it is judged that a compensation which will be described later would be effective. On the other hand, when the absolute value of the difference of Max and Min is not smaller than the set value 2, it is judged that the compensation which will be described later would not be effective. In other words, the judgment is made as to whether or not the image data IL(1-162) and the image data IR(1-162) are in a parallel shift relation to one another or, more specifically, whether or not there is a possibility that the image data IL(1-162) and the image data IR(1-162) are in a parallel shift relation. In addition, it is desirable for the set value 2 to be set to 0 or a value which is close to 0.

When the compensation effectiveness judgment unit 5d judges that the compensation would be effective, i.e., when it judges that there is a possibility that the image data IL(1-162) and the image data IR(1-162) are in a parallel shift relation, a left and right difference compensation unit 5e calculates a value by obtaining the sum of Max and Min and dividing it by 2, i.e., a value based upon a difference of respective maximum image data of the pair of image data rows and a difference of respective minimum image data of the pair of image data rows as a compensation amount (step 3i), and compensates a difference of IL and IR in the memory 5b by use of the calculated compensation amount (step 3j).

As a method of performing compensation in step 3j, for example, LA and RA are compared. If La is smaller than RA, the above-described compensation amount is added to individual image data IL(1-162) of IL and subtracted from individual image data IR(1-162) of IR. If LA is larger than RA, the compensation amount is subtracted from individual image data IL(1-162) of IL and added to individual image data IR(1-162) of IR. In other words, compensation is carried out for parallel-shifting the image data IL(1-162) or the image data IR(1-162) based upon a detected shift amount. Alternatively, compensation for parallel-shifting both of the image data IL(1-162) and the image data IR(1-162) may be carried out. In such case, the total shift amount is set to become the compensation amount.

As described above, a judgment is made as to whether or not the compensation would work effectively. In the case that there is a possibility that the compensation would work effectively, the compensation is carried out. Thus, the possibility that non-productive compensation is carried out is reduced. In the presently described embodiment, if there is a possibility that the image data IL(1-162) and the image data IR(1-162) are in a parallel shift relation, compensation is carried out by parallel-shifting the image data IL(1-162) or the image data IR(1-162), or both of the image data IL(1-162) and the image data IR(1-162), so that it is possible to reduce the probability that the non-productive compensation is carried out.

Also, since the value which was used for judging whether or not the compensation would be effective is also used for calculating the compensation value, dual use of the same data is achieved.

Also, in case that there is no effect due to back-light, since the judgment of whether or not the compensation is effective is not carried out, this judgment may be eliminated when there is no necessity of judging whether or not the compensation is effective.

Figure 3B:
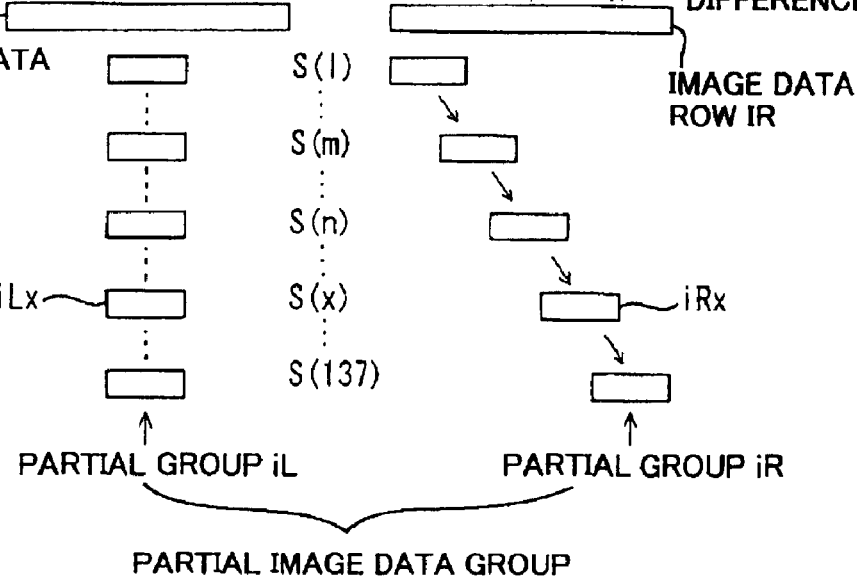

If compensation is carried out at the step 3j, or if the left and right difference is less than the set value 1 at the step 3e and it is judged that there is no effect due to back-light or stray light on the images formed on the pair of optical sensor arrays 3a and 3b, or if it is judged that the compensation would not be effective at the step 3h, correlation calculation is carried out by a correlation calculation unit 5f (step 3k). Correlation calculation may be performed by extracting partial image data groups (iL, iR) from the pair of image data rows (IL, IR) stored in the memory 5b so that their relative positions differ on the optical sensor arrays, and calculating a correlation level based on a combination of the extracted respective partial image data groups (iL, iR). In the presently described embodiment, correlation calculation is performed as follows. The number of data values in the partial image data groups is set at 26, and as shown in FIG. 3B, the partial image data group (iL) which is extracted from the image data row (IL) is fixed and the partial image data group (iR) which is extracted from the image data row (IR) is dislocated one by one. More precisely, correlation calculation is carried out based upon the following equation (1).

$$S(1) = \sum_{i=0}^{25} |1L65 + i - IR1 + i| \quad (1)$$

wherein $$1 = 1 \sim 137 \quad L(1 \sim 162), \quad R(1 \sim 162)$$

When the correlation calculation of step 3k is completed, a maximum correlation level detection unit 5g detects, based upon calculation result of equation (1) carried out by the correlation calculation unit 5f, a local minimal value (hereinafter, referred to as S(x) shown in FIG. 3B), i.e., a maximum correlation level (step 3l).

When the local minimal value S(x) is detected, an interpolation calculation unit 5h compensates x and the local minimal value S(x) by use of an interpolation method which uses the local minimal value S(x) and correlation calculation function values S(x−1) and S(x+1) that come directly before and after it (step 3m). Since this interpolation calculation is a well-known technique, a detailed explanation will be omitted.

When x is compensated by the interpolation calculation, a phase difference detection unit 5i detects a shift amount from a reference position (which is, for example, in the case of outside light triangular ranging like that performed in a non-TTL camera, set to be a position which corresponds to a center position of the image of the object at an infinity in a measurement direction, and in the case of a focus detection apparatus used in a TTL camera, set to be a position which corresponds to a center position of the image of the object when a taking lens is in a focused state) of the compensated x value at the side of the optical sensor 3b, i.e., the phase difference (step 3n). In addition, first and third phase difference detection unit 51 functionally has the correlation calculation unit 5f, the maximum correlation level detection unit 5g, the interpolation calculation unit 5h and the phase difference detection unit 5i. A second phase difference detection unit 52 has the left and right difference compensation unit 5e, the correlation calculation unit 5f, the maximum correlation level detection unit 5g, the interpolation calculation unit 5h and the phase difference detection unit 5i.

When the phase difference is detected, a reliability judgment unit 5j judges whether or not the compensated local minimal value S(x) is larger than a set value 3, i.e., whether or not reliability of the local minimal value S(x) is high (step 3o). More precisely, in case that the local minimal value S(x) is less than a set value 3, it is judged that the reliability is high, and in case that the local minimal value S(x) is larger than the set value 3, it is judged that the reliability is low.

When it is judged that the reliability is high at the step 3o, a phase difference compensation unit 5k carries out a predetermined compensation etc. to the phase difference calculated at the step 3n (step 3p). As this compensation, for example, temperature compensation may be performed. In addition, this compensation may be carried out or may be eliminated in accordance with a required phase difference detection accuracy.

The focusing control unit 7 controls a position of the objective lens 8 based upon the compensated phase difference, and a focusing operation between the objective lens 8 and the image formation unit 9 is carried out. In addition, in case of a non-TTL camera, the foregoing is not limited and distance data to the object 2 may calculated by a distance detection unit 51 based upon the compensated phase difference and, based upon this distance data, the focusing control unit 7 controls the position of the objective lens 8 and the focusing operation between the objective lens 8 and the image formation unit 9 may be carried out.

When it is judged that the reliability is low at the step 3o, a back-light processing unit 5m carries out a predetermined back-light processing, for example, a release lock and a fixed distance output (step 3q).

Figure 4A:
FIGS. 4A to 4D are explanatory views showing outputs of a pair of image data rows (IL, IR).
Figure 4B:
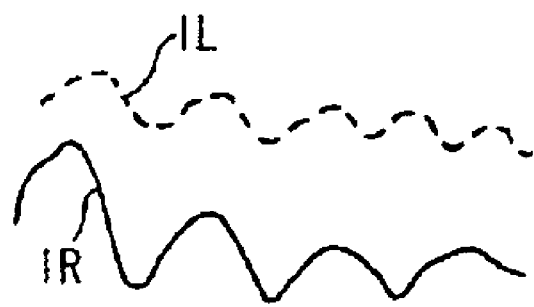
Figure 4C:
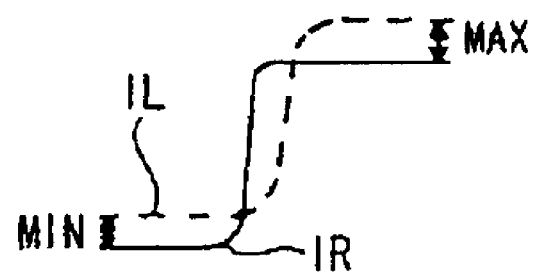
Figure 4D:

By carrying out such compensation, when the image signal is as shown in FIGS. 4A and 4B, non-productive compensation is prevented from being carried out and, as shown in FIG. 4C, when the pair of image data are in a parallel shift relation, effective compensation is carried out. Also, even when the pair of image data are as shown in FIG. 4D, it becomes possible to carry out back-light processing by the reliability judgment at step 3o.

In the foregoing description, an example of correlation calculation is described in which one of the partial image data groups (iL) is fixed and the other partial image data group (iR) is dislocated one by one. Alternatively, it is possible to change the method of the correlation calculation as desired. For example, as disclosed in JP-A-8-166237, both of the partial image data groups may be dislocated sequentially so that their relative positions differ.

In the foregoing description, the set value 2 which is used for judgment at the compensation effectiveness judgment unit 5d is set to be a fixed value. However, this set value 2 may be made variable. In this case, if the set value is changed according to various situations, it becomes possible to improve the accuracy of the compensation effectiveness judgment. For example, the set value 2 is made to be changed based upon the difference of the pair of image data rows. As one concrete example, such a value that an absolute value of LA-RA is divided by the set value 2 which is the above-described fixed value and then, multiplied by a constant number, and such a value that the absolute value of LA-RA is multiplied by a predetermined constant number are set to be the set value 2. In this case, since, as the difference of the pair of image data rows is enlarged, the set value 2 is also enlarged, it becomes possible to reduce the effect of noise and the like, which are likely increased as the difference of the pair of image data rows is enlarged at the time of the judgment of compensation effectiveness, and also, it becomes possible to use LA and RA which were used for the back-light judgment as a parameter of the set value 2. Thus, it is possible to achieve dual uses of the same data.

In the foregoing description, when calculating the compensation value at the compensation value calculation unit 5h, (Max+Min)/2 is set as the compensation value. This compensation value may be variable. In such case, if the compensation value is changed according to various circumstances, it becomes possible to improve the compensation accuracy. For example, the compensation value may be changed based upon the difference of the pair of image data rows. As examples, a value in which (Max+Min)/2 is multiplied by the absolute value of LA-RA and then divided by the set value 2 of the above-described fixed value, or a value in which (Max+Min)/2 is multiplied by the absolute value of LA-RA and then multiplied by the predetermined constant number can be used as the compensation value. In such case, the difference of the pair of image data rows is reflected in the compensation value. It is also possible to use LA and RA, which were used for the back-light judgment, as a parameter of the set value 2, and it is thus possible to achieve dual uses of the same data.

In the foregoing description, the number of data values of respective image data rows (IL, IR) is set at 162 and the number of data values of the partial image data group is set at 26. However, it is possible to change these numbers as desired.

Also, in the foregoing description, an example in which the invention is embodied as an imaging apparatus is shown. However, the invention is not limited to an imaging apparatus. For example, it is possible to use the invention in various range finding apparatuses, focal point detection apparatuses, and the like.

According to the present invention, when it is judged that the predetermined compensation would not be effective based upon the image data row, the phase difference between the images formed on the pair of sensor arrays is detected, and when it is judged that the predetermined compensation would be effective, the predetermined compensation is applied to the image data row. Based on the image data obtained after compensation, the phase difference between the images formed on the pair of sensor arrays is detected, and it becomes possible to prevent non-productive compensation.

What is claimed is:

1. A phase difference detection method comprising:
    a judgment step of judging whether or not a predetermined compensation would be effective for compensating an image data row which is generated in response to outputs of a pair of optical sensor arrays on which images of an object are formed;
    a first phase difference detection step of detecting a phase difference between the images formed on the pair of sensor arrays based upon the image data row when it is judged that the predetermined compensation would not be effective; and
    a second phase difference detection step of carrying out the predetermined compensation on the image data row when it is judged that the predetermined compensation would be effective and detecting a phase difference between the images formed on the pair of sensor arrays based upon the image data row after carrying out the predetermined compensation.

2. A phase difference detection method according to claim 1; wherein the judgment step comprises the step of judging that the predetermined compensation would be effective when an output waveform of one of the pair of optical sensor arrays is shifted in parallel with respect to an output waveform of the other optical sensor array; and the step of carrying out the predetermined compensation is performed based upon an amount of the shift.

3. A phase difference detection method according to claim 1; wherein the image data row is a pair of image data rows each comprising a plurality of image data values which are generated in response to the outputs of the pair of optical sensor arrays on which the images of the object are formed; the judgment step comprises the step of judging that the predetermined compensation would be effective when a difference between a difference in maximum image data values in each of the pair of image data rows and a difference in minimum image data values in each of the pair of image data rows falls within a predetermined range; and the second phase difference detection step of carrying out the predetermined compensation comprises the step of compensating the pair of image data rows by a compensation value determined based upon the difference in the maximum image data values and the difference in the minimum image data values.

4. A phase difference detection method according to claim 1; wherein the image data comprises a pair of image data rows each comprising a plurality of image data values which are generated by the pair of optical sensor arrays on which images of an object are formed; the judgment step comprises the step of judging that compensation would be effective when a difference between a difference in maximum image data values in each of the pair of image data rows and a difference in minimum image data values in each of the pair of image data rows falls within a predetermined range; and the second phase difference detection step of carrying out compensation comprises the step of compensating the pair of image data rows by a compensation value determined based upon the difference in the maximum image data values and the difference in the minimum image data values.

5. A phase difference detection apparatus comprising:
 a first judgment unit for judging whether or not a predetermined compensation would be effective for compensating an image data row which is generated in response to outputs of a pair of optical sensor arrays on which images of an object are formed;
 a first phase difference detection unit for detecting a phase difference between the images formed on the pair of sensor arrays based upon the image data row when it is judged by the first judgment unit that the predetermined compensation would not be effective;
 a second phase difference detection unit for carrying out the predetermined compensation with respect to the image data row when it is judged that the predetermined compensation would be effective and detecting a phase difference between the images formed on the pair of sensor arrays based upon the image data row after carrying out the predetermined compensation;
 a second judgement unit for judging whether or not the images formed on the pair of sensor arrays based on the image data row are affected by back-light; and
 a third chase difference detection unit for detecting a chase difference between the images formed on the pair of sensor arrays based upon the image data row when the second judgement unit judges that the images are not affected by back-light;
 wherein the first judgement unit carries out the judgement only when the second judgement unit judges that the images formed on the pair of sensor arrays are affected by back-light.

6. A range finding apparatus comprising: a phase difference detection apparatus according to claim 5; and a distance detection unit for calculating a distance to the object based upon a phase difference detected by the phase difference detection apparatus.

7. An imaging apparatus comprising: a phase difference detection apparatus according to claim 5; an objective lens; an image formation unit on which an image of the object is formed after passing through the objective lens; and a focusing control unit for carrying out a focusing operation between the objective lens and the image formation unit in response to the phase difference calculated by the phase difference detection apparatus.

8. A phase difference detection apparatus comprising:
 a first judgment unit for judging that a predetermined compensation would be effective for compensating an image data row which is generated in response to outputs of a pair of optical sensor arrays on which images of an object are formed by determining when an output waveform of one of the pair of optical sensor arrays is shifted in parallel with respect to an output waveform of the other optical sensor array;
 a first phase difference detection unit for detecting a chase difference between the images formed on the pair of sensor arrays based upon the image data row when it is not judged by the first judgment unit that the predetermined compensation would be effective; and
 a second phase difference detection unit for carrying out the predetermined compensation with respect to the image data row based on an amount of the shift when it is judged that the predetermined compensation would be effective and detecting a phase difference between the images formed on the pair of sensor arrays based upon the compensated image data row.

9. A phase difference detection apparatus according to claim 8; further comprising a second judgment unit for judging whether or not the images formed on the pair of sensor arrays based on the image data row are affected by back-light; and a third phase difference detection unit for detecting a phase difference between the images formed on the pair of sensor arrays based upon the image data row when the second judgment unit judges that the images are not affected by back-light; wherein the first judgment unit carries out the judgment only when the second judgment unit judges that the images formed on the pair of sensor arrays are affected by back-light.

10. A range finding apparatus comprising: a phase difference detection apparatus according to claim 8; and a distance detection unit for calculating a distance to the object based upon a phase difference detected by the phase difference detection apparatus.

11. An imaging apparatus comprising: a phase difference detection apparatus according to claim 8; an objective lens; an image formation unit on which an image of the object is formed after passing through the objective lens; and a focusing control unit for carrying out a focusing operation between the objective lens and the image formation unit in response to the phase difference calculated by the phase difference detection apparatus.

12. A phase difference detection apparatus comprising:
 a first judgment unit for judging that a predetermined compensation would be effective for compensating an image data row which is generated in response to outputs of a pair of optical sensor arrays on which images of an object are formed when a difference between a difference in maximum image data values in each of the pair of image data rows and a difference in minimum image data values in each of the pair of image data rows falls within a predetermined range;
 a first phase difference detection unit for detecting a phase difference between the images formed on the pair of sensor arrays based upon the image data row when it is not judged by the first judgment unit that the predetermined compensation would be effective; and a second chase difference detection unit for carrying out the predetermined compensation with respect to the image data row based upon the difference in the maximum image data values and the difference in the minimum image data values when it is judged that the predetermined compensation would be effective and detecting a phase difference between the images formed on the pair of sensor arrays based upon the compensated image data row.

13. A phase difference detection apparatus according to claim 12; further comprising a second judgment unit for judging whether or not the images formed on the pair of sensor arrays based on the image data row are affected by back-light; and a third phase difference detection unit for detecting a phase difference between the images formed on the pair of sensor arrays based upon the image data row when the second judgment unit judges that the images are not affected by back-light; wherein the first judgment unit carries out the judgment only when the second judgment unit judges that the images formed on the pair of sensor arrays are affected by back-light.

14. A range finding apparatus comprising: a phase difference detection apparatus according to claim 12; and a distance detection unit for calculating a distance to the object based upon a phase difference detected by the phase difference detection apparatus.

15. An imaging apparatus comprising: a phase difference detection apparatus according to claim 12; an objective lens; an image formation unit on which an image of the object is formed after passing through the objective lens; and a focusing control unit for carrying out a focusing operation between the objective lens and the image formation unit in response to the phase difference calculated by the phase difference detection apparatus.

16. A phase difference detection apparatus according to claim 12; further comprising a correlation calculation unit for performing correlation calculation by extracting partial image data groups from the pair of image data rows and determining a maximum correlation level therebetween.

17. A phase difference detection apparatus according to claim 16; wherein the correlation calculation unit performs correlation calculation by extracting a fixed partial image data group from one of the pair of image data rows, and extracting different partial image data groups from the other image data row, and comparing the extracted partial image data groups.

18. A phase difference detection apparatus according to claim 16; further comprising an interpolation calculation unit for compensating the maximum correlation level by performing an interpolation technique thereon.

19. A phase difference detection apparatus according to claim 18; wherein the second phase difference detection unit detects a shift amount from a reference position of the compensated maximum correlation level.

20. A phase difference detection apparatus according to claim 19; further comprising a reliability judgment unit for judging whether the compensated maximum correlation level is larger than a predetermined value; and wherein the second phase difference compensation unit performs compensation on the phase difference if the compensated maximum correlation level is lower than the predetermined value.

21. A range finding apparatus comprising:
a pair of spaced-apart lenses for forming first and second images of an object spaced by a given distance from the respective lenses;
a pair of optical sensor arrays respectively arranged behind the lenses relative to the object for producing first and second output signals corresponding to the images formed by the lenses;
an A/D converter for converting the first and second output signals of the optical sensor arrays into corresponding first and second digital signals;
a memory unit for storing the digital signals;
a judgment unit for calculating a first difference in average values of the first and second digital signals and judging whether or not the first difference exceeds a first predetermined value;
a compensation effectiveness unit for performing a compensation effectiveness determination if the first difference exceeds the first predetermined value by calculating a second difference between a maximum value of the first digital signal and a maximum value of the second digital signal and a third difference between a minimum value of the first digital signal and a minimum value of the second digital signal, judging whether or not a fourth difference between the second difference and the third difference exceeds a second predetermined value, and determining that compensation would be effective if the fourth difference exceeds the second predetermined value;
a compensation unit for calculating a compensation value if the fourth difference exceeds the second predetermined value and compensating the stored digital signals stored in the memory based on the compensation value;
a correlation calculation unit for performing correlation calculation by extracting partial image data groups from the first and second digital signals stored in the memory and determining a maximum correlation level therebetween;
an interpolation calculation unit for compensating the maximum correlation level by performing an interpolation technique; and
a phase difference detection unit for detecting a shift amount from a reference position of the compensated maximum correlation level.

22. A range finding apparatus according to claim 21; wherein the compensation unit calculates the compensation value by dividing by 2 a sum of the second difference and the third difference.

23. A range finding apparatus according to claim 21; further comprising a reliability judgment unit for judging whether the compensated maximum correlation level is larger than a third predetermined value; and a phase difference compensation unit for compensating the phase difference if the compensated maximum correlation level is lower than the third predetermined value.

24. A phase difference detection method comprising:
a judgment step of judging whether or not compensation would be effective for compensating image data which is generated by a pair of optical sensor arrays by comparing outputs of the pair of optical sensor arrays;
a first phase difference detection step of detecting a phase difference between the image data generated by the pair of optical sensor arrays without performing compensation when it is judged that compensation would not be effective; and
a second phase difference detection step of carrying out compensation on the image data when it is judged that compensation would be effective and detecting a phase difference between the image data generated by the pair of optical sensor arrays based upon the compensated image data.

25. A phase difference detection method according to claim 24; wherein the judgment step comprises the step of judging that compensation would be effective when an output waveform of one of the pair of optical sensor arrays is shifted in parallel with respect to an output waveform of the other optical sensor array; and the step of carrying out compensation is performed based upon an amount of the shift.

* * * * *